(12) United States Patent
Stewart

(10) Patent No.: US 6,507,024 B2
(45) Date of Patent: Jan. 14, 2003

(54) LOW COST INFRARED CAMERA

(75) Inventor: Robert E. Stewart, Woodland Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 15 days.

(21) Appl. No.: 09/778,521

(22) Filed: Feb. 7, 2001

(65) Prior Publication Data

US 2002/0104968 A1 Aug. 8, 2002

(51) Int. Cl.⁷ .................................................. G01J 5/02
(52) U.S. Cl. ...................... 250/353; 250/332; 250/330; 359/351; 359/730
(58) Field of Search ................................ 250/353, 332, 250/330; 359/351, 730

(56) References Cited

U.S. PATENT DOCUMENTS

| 4,238,675 A | 12/1980 | Turlej et al. |
| 4,404,468 A | 9/1983 | Kleinschmidt |
| 4,551,711 A | 11/1985 | Akiyama et al. |
| 6,023,061 A | * 2/2000 | Bodkin .................. 250/332 |

* cited by examiner

*Primary Examiner*—Constantine Hannaher
*Assistant Examiner*—Andrew Israel
(74) *Attorney, Agent, or Firm*—Snell & Wilmer LLP

(57) ABSTRACT

An infra-red camera apparatus having a primary mirror assembly formed in a first molded plastic housing; and, a secondary mirror assembly formed in a second molded plastic housing and disposed in front of and in optical alignment with the primary mirror assembly for collecting an image. The first and second housings snap together for assembly of the camera. A focal plane array is disposed in optical alignment with the primary and secondary mirrors for receiving an image focused thereon by the secondary mirror. A substrate is added for supporting the focal plane array and system electronics, which are responsive to images formed on the focal plane array.

18 Claims, 2 Drawing Sheets

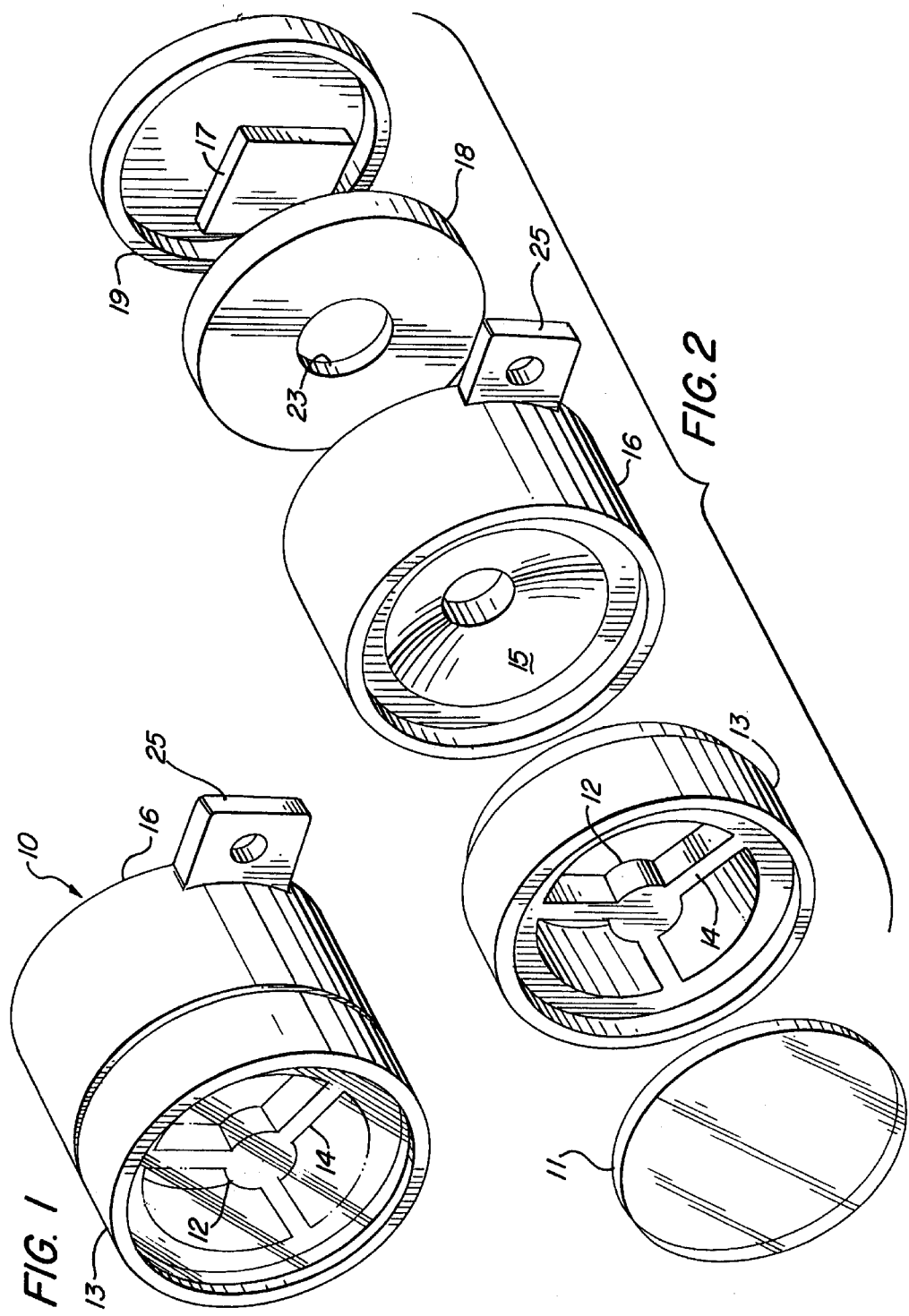

LOW COST INFRARED CAMERA

BACKGROUND OF THE INVENTION

1. Field of the Invention

The present invention relates to infrared cameras in general and in particular to an improved lens structure for low cost infrared cameras.

2. Description of Related Art

There is a need for a low-cost infrared camera that would be useful in many applications, including household use for detecting intruders and fires. Several attempts have been made to construct such a camera. One example is disclosed in U.S. Pat. No. 5,763,882, entitled Low Cost Night Vision Camera. In this prior art camera, a reflective lens system is disclosed which contains many parts. Another example is disclosed in U.S. Pat. No. 5,675,149, entitled Compact Thermal Camera. This prior art camera includes a refractive lens system and likewise contains many parts.

Therefore, a need exists for an infrared camera that would be easy to manufacture and simple in structure, thereby rendering a low-cost product. The structure of the present invention solves these problems in a new and unique manner.

SUMMARY OF THE INVENTION

Accordingly, the present invention provides an infrared camera that is easy to manufacture and low in cost.

The present invention also provides an infrared camera with a lens system having a minimum transmission of 90%, with an average of 95%.

A feature of the present invention is the provision of a simplified reflective lens system.

Another feature of the present invention is the provision of a lens system that is easy to assemble.

Yet another feature of the present invention is the provision of an infra-red camera that is low in cost, snaps together easily during assembly and includes a pair of molded plastic reflective lenses, an encapsulated focal plane-array assembly and a lens cover.

Still other features of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The general purpose of this invention, as well as a preferred mode of use, its advantages will best be understood by reference to the following detailed description of an illustrative embodiment with reference to the accompanying drawings in which like reference numerals designate like parts throughout the figures thereof, and wherein:

FIG. 1 illustrates an infrared camera constructed in accordance with the teachings of the present invention;

FIG. 2 is an exploded view of the infra-red camera in accordance with the present invention; and, FIG. 3 is a cross-sectional diagram of the infrared camera constructed in accordance with the teachings of the present invention.

DETAILED DESCRIPTION OF THE PREFERRED EMBODIMENTS

Figure 3:
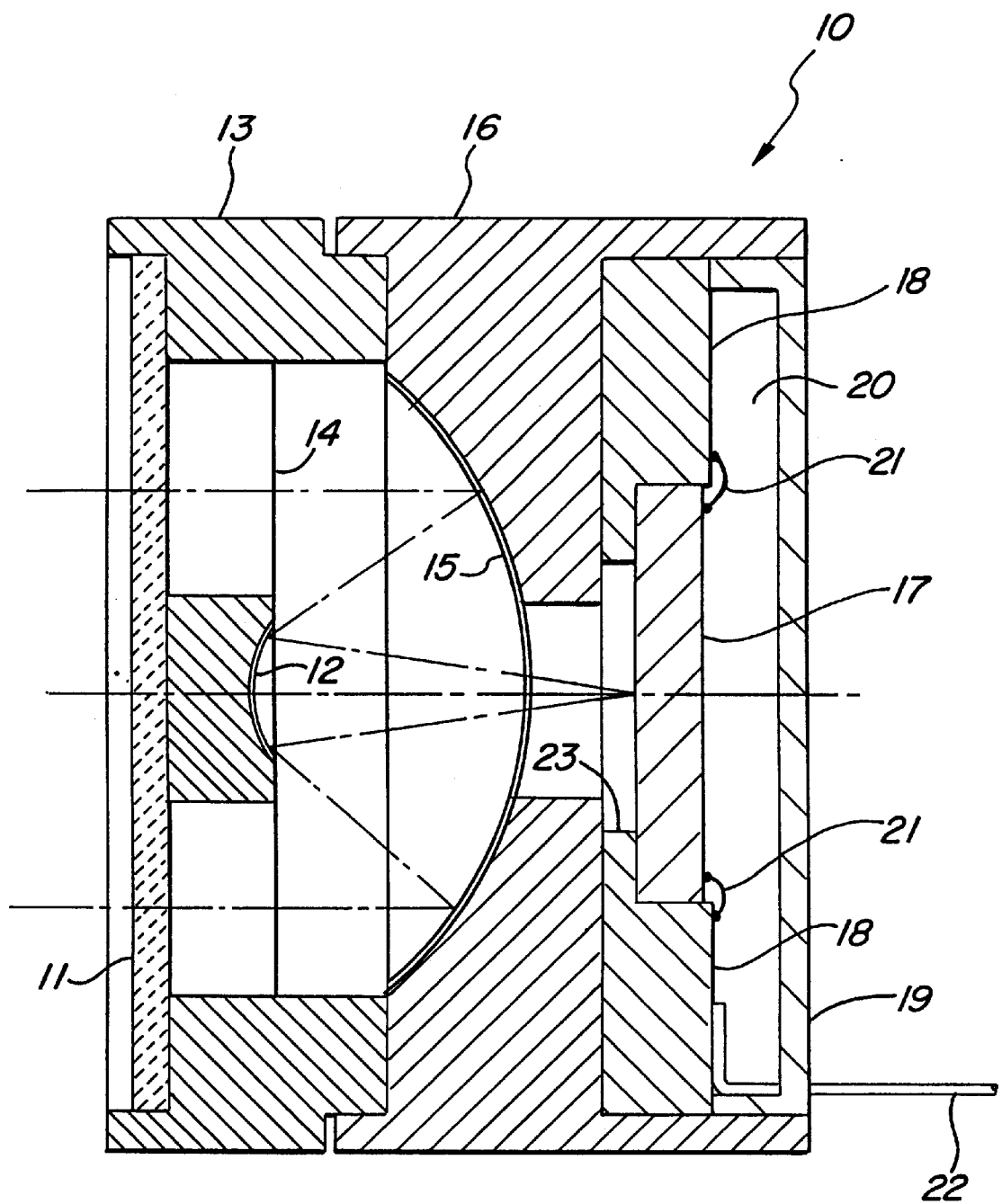

The following description is provided to enable any person skilled in the art to make and use the invention and sets forth the beat modes contemplated by the inventor of carrying out his invention. Various modifications, however, will remain readily apparent to those skilled in the art, since the general principles of the present invention have been defined herein specifically to provide a low-cost infra-red camera that is simple in construction and easy to manufacture.

Referring now to FIGS. 1 and 2 together, perspective and exploded views of the illustrated embodiment of the inventive camera in assembled and disassembled relation, respectively, is shown. The camera 10 includes a lens cover 11, a secondary mirror 12, a secondary mirror housing 13, secondary mirror support webs 14, a primary mirror 15, a primary mirror housing 16, a focal plane array 17, and focal plane array electronics mounted on a substrate 18. A back plate 19 covers the housing 16 on the side opposite the primary mirror 15. An opening 23 is formed in the substrate 18 forming a window on the focal plane 17. Flanges 25 are attached to the housing 16 for mounting the camera 10.

Is noted that the low cost lens arrangement of the present invention has an advantage for wavelengths above one micron. Moreover, the lens cover 11 may be made of intrinsic silicon or other suitable material. The material for optimum use for cover 11 depends on the wavelength. For the 1 to 3 μm wavelength camera, fused silica, silicon and sapphire are options; for the 3 to 5 μm wavelength camera, silicon and sapphire are lens materials of choice. For the 8 to 12 μm wavelength camera, ZnS based glasses, and silicon to some extent are an option. Each of the mirrors 12 and 15 are preferably manufactured of metalized molded plastic, which could snap together as shown in FIG. 1. The reflection losses of high quality mirrors are significantly less than the transmission losses of refractive or defractive optical elements. Also, since it is reflective, the optical properties of the mirror's structural elements are not important. They can, therefore, be made of any suitable material such as the material currently used in the manufacture of plastic lenses. The use of metalized molded plastic for the mirror elements results in very low cost in high volume production.

FIG. 3 shows a cross-sectional view of the camera of this invention after assembly. This Figure illustrates all the parts assembled and in optical alignment with the focal plane array 17. The array 17 is positioned at the focal point of the lens (i.e., mirrors 12 and 15) and may comprise any semiconductor photo array available in the electronics market. Likewise, the associated array electronics mounted on the substrate 18 may comprise appropriate electronics available in the market. One such array and associated electronics is available from the Electro-Optical Systems Dicision of Litton Systems, Inc., under imaging devices or any semiconductor imaging array available from most semiconductor manufacturers. It is pointed out that an amplifier could be used to amplify the output signals from the array 17. Once the camera 10 is assembled, an encapsulant 20, such as an appropriate sealant, is inserted between the array 17 and electronics 19 and the back plate 19.

FIG. 3 also illustrates the alignment of the secondary mirror 12 with the primary mirror 15, which forms a Cassegrainian lens system. Generally, a Cassegrainian lens system employs a small convex mirror to reflect light back through a small hole in the primary mirror to a focus located behind the primary lens. This lens system was chosen for its very low loss since the imaging is accomplished totally through reflection. The simplest embodiment of this invention sets the focus at infinity. That is, the simplest version of the camera 10 does not allow for any adjustment of the focus. However, it would be a simple matter to add threads between the secondary mirror housing 13 and the primary mirror housing 16 so that a change could be made in the focal length.

Also shown in the FIG. 3 cross-section are electrical connections 21 between the focal plane array 17 and the system electronics, which is mounted on the substrate 18. The substrate 18 also contains a flex cable harness 22. The harness 22 provides electrical connection from the electronics on the substrate 18 to other circuitry (not shown) responsive to the images detected by the focal plane array 17.

While the invention has been particularly shown and described with reference to a preferred embodiment, it will be understood by those skilled in the art that various changes in form and detail may be made therein without departing from the spirit and scope of the invention. For example, the camera 10 could perform well outside of the infra-red range of light.

Those skilled in the art will appreciate that various adaptations and modifications of the just described preferred embodiments can be configured without departing from the scope and spirit of the invention. Therefore, it is to be understood that within the scope of the appended claims, the invention may be practiced other than as specifically described herein.

What is claimed is:

1. An infra-red camera comprising:
   a. a primary mirror assembly formed in a first molded plastic housing;
   b. a secondary mirror assembly formed in a second molded plastic housing and in optical alignment with said primary mirror assembly for collecting an image therefrom, said first and second housings being coaxially aligned and spaced at a distance that sets the focus of the camera at infinity when they are snapped together for assembly of said camera;
   c. a focal plane array disposed in optical alignment with said primary and secondary mirrors for receiving an image focused thereon by said mirrors; and,
   d. a substrate for supporting said focal plane array and system electronics responsive to images formed on said focal plane array.

2. The camera as in claim 1 wherein said primary mirror is formed of metalized molded plastic.

3. The camera as in claim 1 wherein said secondary mirror is formed of metalized molded plastic.

4. The camera as in claim 1 wherein said first and said second housings are adjustable from one another such that the focus of said camera may be changed.

5. The camera as claim 1 wherein said substrate is encapsulated with a sealant and snapped onto the outside of said first housing.

6. The camera as in claim 1 wherein an intrinsic silicon lens cover is snapped onto the outside of said second housing to protect said mirrors from contamination.

7. The camera as in claim 1 wherein said secondary mirror is disposed in front of said primary mirror.

8. An infra-red camera comprising:
   a. primary mirror assembly formed of metalized molded plastic and supported in a first housing;
   b. a secondary mirror assembly formed of metalized molded plastic and supported in a second housing, said first and second housings being coaxially aligned and spaced at a distance that sets the focus of the camera to infinity when one snaps together with the other wherein said first and second mirrors are in optical alignment with one another for collecting an image;
   c. a semiconductor focal plane array disposed in said second housing and in optical alignment with said primary and secondary mirrors for receiving an image focused thereon by said mirrors; and,
   d. a substrate disposed in said second housing for supporting said focal plane array and system electronics responsive to signals produced by said focal plane array in response to an image focused thereon.

9. The camera as in claim 8 wherein said first and said second housings are adjustable from one another such that the focus of said camera may be changed.

10. The camera as claim 8 wherein said substrate is encapsulated with a sealant snapped onto the outside of said second housing.

11. The camera as in claim 8 wherein an intrinsic silicon lens cover is snapped onto the outside of said second housing to protect said mirrors from contamination.

12. A night vision apparatus comprising:
   a. a primary reflective element adapted for receiving energy and supported in a first housing;
   b. a secondary reflective element adapted for receiving energy reflected from said primary reflective element and supported in a second housing, said first and second housings being aligned coaxially and spaced at a distance that sets the focus of the apparatus to infinity when one snaps together with the other;
   c. a focal plane array disposed in said second housing and in optical alignment with said primary and secondary reflective elements for receiving energy received from said reflective elements; and,
   d. a substrate disposed in said second housing for supporting said focal plane array and system electronics responsive to signals produced by said focal plane array in response to energy received.

13. The apparatus as in claim 12 wherein said first reflective element is formed from metalized molded plastic.

14. The apparatus as in claim 12 wherein said first reflective element is formed from metalized molded plastic.

15. The apparatus as in claim 12 wherein said first and said second housings are adjustable from one another such that the focus of said apparatus may be changed.

16. The apparatus as in claim 12 wherein said substrate is encapsulated with a sealant and snapped onto the outside it said second housing.

17. The apparatus as in claim 12 wherein an intrinsic silicon lens cover is snapped onto the outside of said first housing to protect said reflective elements from contamination.

18. The apparatus as in claim 12 wherein said second housing includes flanges for mounting said apparatus.

* * * * *